United States Patent [19]
Gerig et al.

[11] Patent Number: 6,120,274
[45] Date of Patent: Sep. 19, 2000

[54] MOLD ASSEMBLY FOR MOLDING A REMOTELY LOCATED ATTACHMENT MEMBER ON A SHEET OF MATERIAL

[75] Inventors: Grant A. Gerig, Holland; Steven C. Dubay, Rockford; David E. Nestell, Spring Lake, all of Mich.

[73] Assignee: Donnelly Corporation, Holland, Mich.

[21] Appl. No.: 08/980,076

[22] Filed: Nov. 26, 1997

[51] Int. Cl.[7] .............................. B29C 33/14; B29C 45/14
[52] U.S. Cl. ........................ 425/116; 425/127; 425/129.1; 425/121; 264/252
[58] Field of Search .................................. 425/116, 121, 425/125, 127, 129.1; 264/252

[56] References Cited

U.S. PATENT DOCUMENTS

| | | | |
|---|---|---|---|
| 4,398,875 | 8/1983 | Kawashima et al. | 425/127 |
| 4,561,625 | 12/1985 | Weaver | 264/252 |
| 4,584,155 | 4/1986 | Zanella | 264/252 |
| 4,688,752 | 8/1987 | Barteck et al. | 264/252 |
| 4,732,553 | 3/1988 | Hofer | 264/252 |
| 4,915,395 | 4/1990 | Barteck | 264/252 |
| 5,061,429 | 10/1991 | Yoshihara et al. | 425/116 |
| 5,475,956 | 12/1995 | Agrawal et al. | 52/208 |
| 5,635,281 | 6/1997 | Agrawal | 428/192 |
| 5,665,397 | 9/1997 | Fisher et al. | 425/116 |
| 5,676,898 | 10/1997 | Yokota et al. | 264/219 |
| 5,705,113 | 1/1998 | Kane et al. | 264/261 |
| 5,707,473 | 1/1998 | Agrawal et al. | 156/245 |
| 5,851,470 | 12/1998 | Yokota et al. | 264/219 |
| 5,916,600 | 6/1999 | Dubay et al. | 425/116 |

FOREIGN PATENT DOCUMENTS

| | | |
|---|---|---|
| 113480 | 7/1983 | Japan . |
| 196317 | 10/1985 | Japan . |

*Primary Examiner*—Angela Ortiz
*Attorney, Agent, or Firm*—Van Dyke, Gardner, Linn & Burkhart, LLP

[57] ABSTRACT

A mold assembly and method for holding a panel or sheet of material such as glass while molding a member around an attachment member and a gasket around a peripheral portion of the panel from a thermoplastic or other moldable material such as PVC. The assembly and method provides a movable, secondary pressure pad which reduces the percentage of broken panels of material. The mold assembly includes a first mold section and a second mold section, which define a mold cavity therebetween. The first mold section includes a first sheet holding surface adjacent the mold cavity, and the second mold section includes a movable, primary pressure pad having a second sheet holding surface adjacent the mold cavity. The primary pressure pad is urged toward the sheet by resilient members to hold the sheet between the first and second holding surfaces in a manner so that the peripheral portion of the sheet extends into the cavity for molding a gasket thereon. The secondary pressure pad is supported by one of the second mold section and the movable, primary pressure pad and includes an attachment member holder, preferably a recess, which holds and positions the attachment member remote from the peripheral portion of the sheet during molding. The secondary pressure pad includes a second mold cavity which extends around the attachment so that the moldable material injected into the mold apparatus will form a molded member around the attachment member to thereby adhere the attachment member to the sheet.

47 Claims, 8 Drawing Sheets

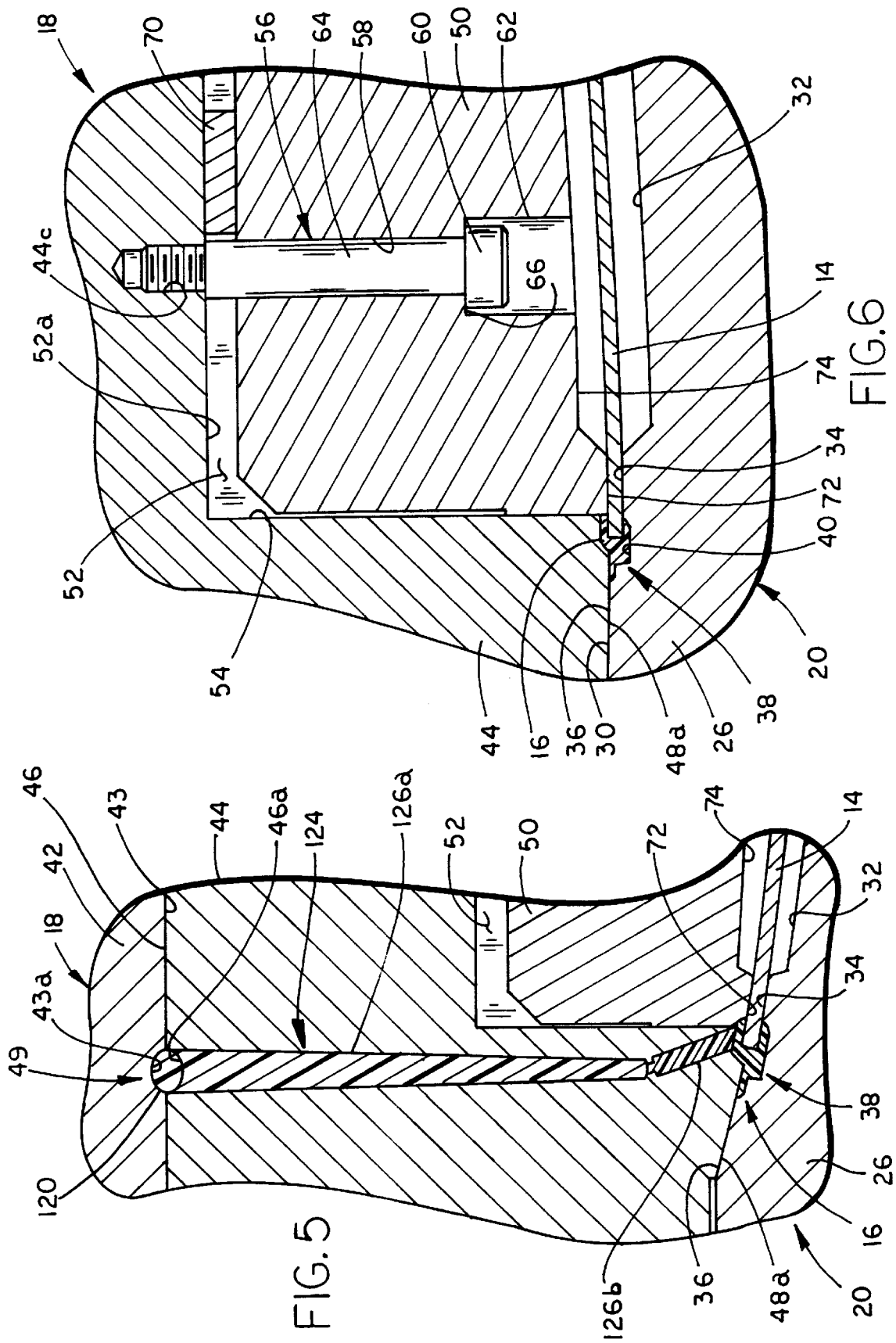

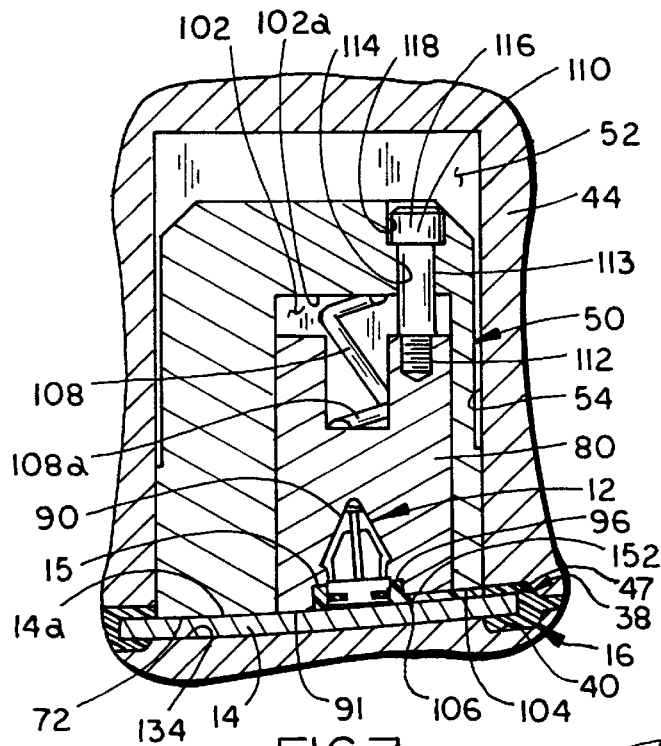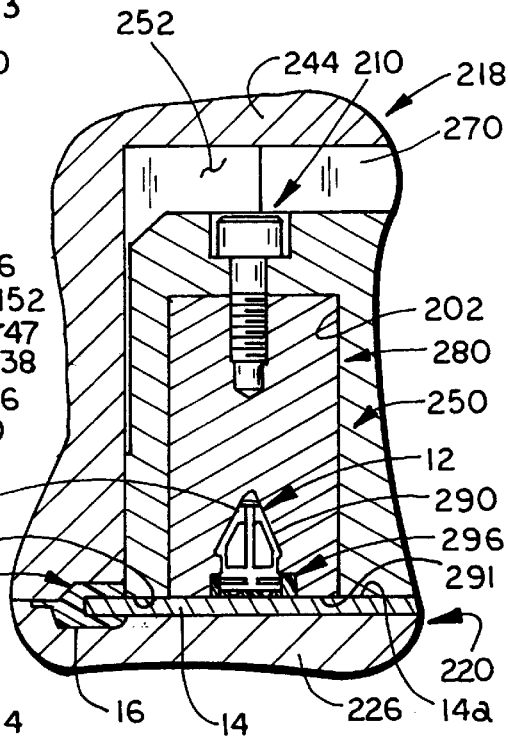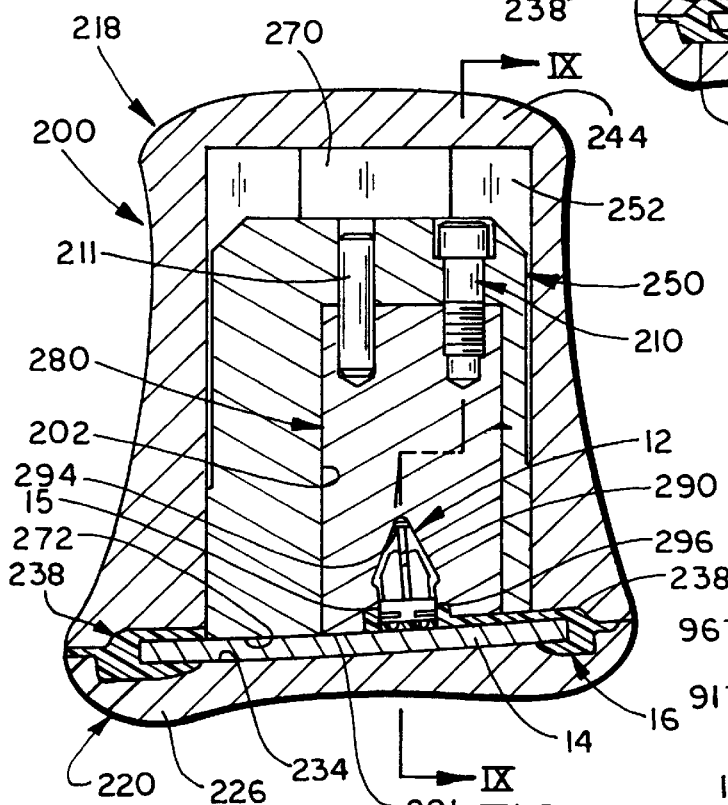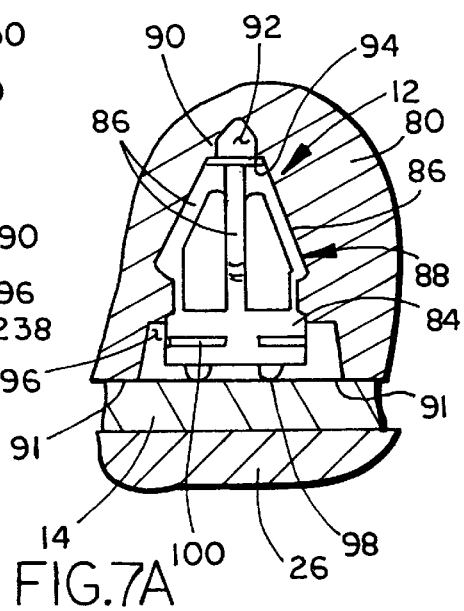

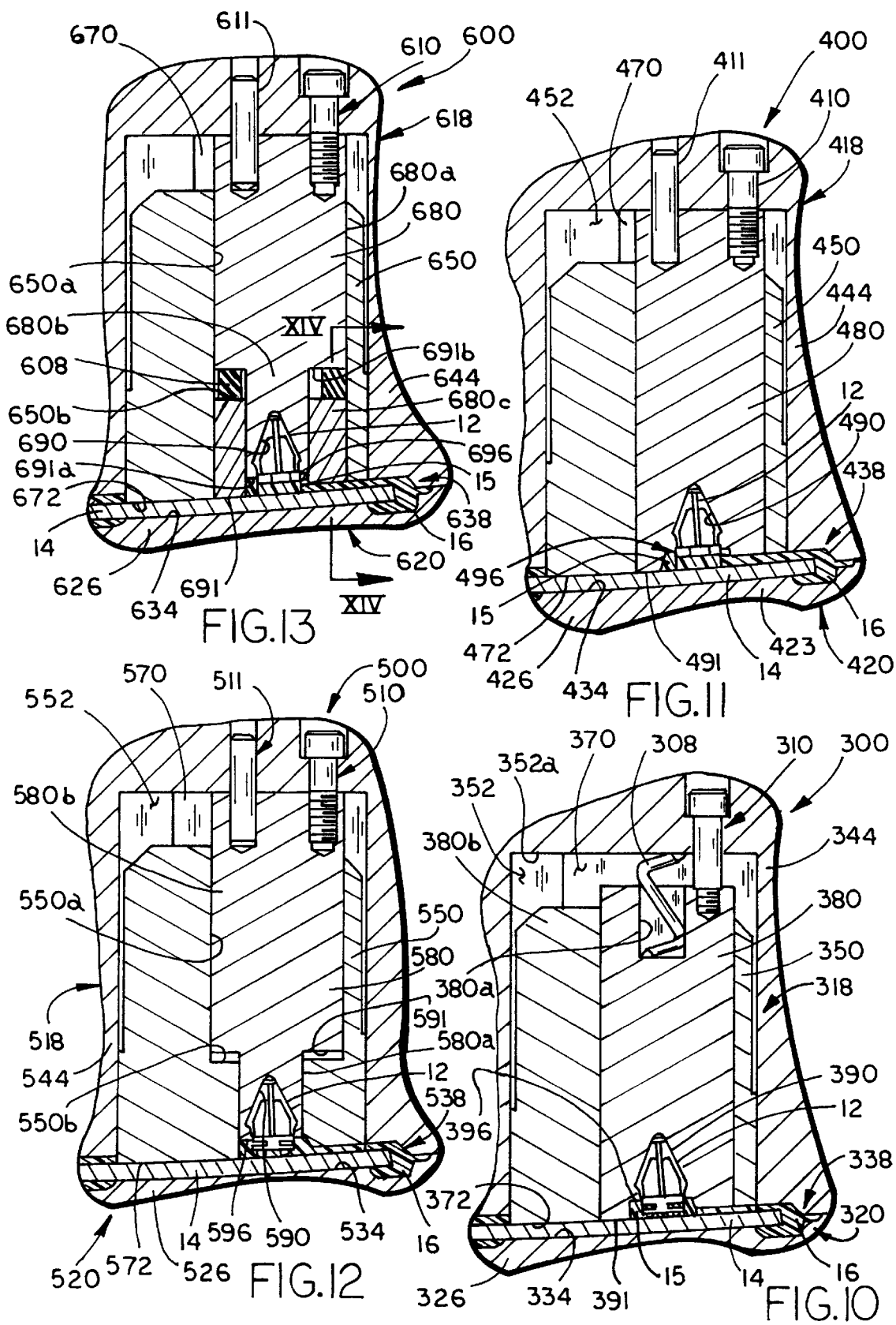

ern of the glass sheet by reaction injection molding or
MOLD ASSEMBLY FOR MOLDING A REMOTELY LOCATED ATTACHMENT MEMBER ON A SHEET OF MATERIAL

TECHNICAL FIELD AND BACKGROUND OF THE INVENTION

This invention relates to mold structures and methods for molding and, more particularly, to mold structures and methods for molding a remote attachment member to a sheet or panel of material, for example glass, to form a modular vehicle component assembly for applications including window assemblies, decorative trim assemblies, and the like.

In recent years the manufacturing of automobiles and other vehicles has included the use of light weight, strong, modular panel assemblies which are made and installed as a single unit in the vehicle. For example, newer modular window assemblies include a window panel with a gasket molded around the periphery of the window panel and may further include fasteners molded with the gasket to provide a means for attaching the window assembly to the vehicle. Recent trends in body styling preferably include the window assembly mounted flush with the body of the vehicle. The resulting assembly requires much less labor for installation than has been previously known. Examples of this type of modular window assembly are shown in U.S. Pat. Nos. 4,072,340 and 4,139,234. Generally, these assemblies include a sheet of glass and a peripheral casing or gasket of molded polymeric material which extends around at least portions of the periphery of the glass.

The production of such modular window assemblies requires the combination of a sheet of glass and a polymeric gasket. The glass is configured to cover the shape of an opening in a vehicle, such as a windshield opening, a back light opening, or a side view opening as well as being curved to the contour of the overall vehicle body shape. The gasket or casing must be formed and adhered to a portion of the glass such that its periphery provides at least a secondary seal and also provides appropriate trim or body filling portions to meet required appearance standards. The gasket or casing is typically applied to the periphery or another portion of the glass sheet by reaction injection molding or PVC molding. One significant problem frequently encountered in molding gaskets and fasteners is the breakage of glass when the mold sections used to make such assemblies are closed under clamp tonnage. Curved and contoured panels inherently include a relatively wide range of piece to piece variation in their contour. Consequently, when rigid mold sections are closed around a sheet having a greater variation in contour than the mold permits, such sheet may be bent beyond its fracture point or be broken, chipped, damaged, or otherwise made unsuitable for use. This is especially true for window panels which incorporate fasteners into the gasket or, in preferred form, include remotely located fasteners.

During the molding process of curved panels, greater variations in the glass panel occur in the central region of the sheet than in the peripheral portion of the sheet. Therefore, molding apparatuses typically hold the sheet adjacent the peripheral portion of the sheet where the sheet to sheet variations are significantly smaller and can be absorbed by the molding apparatus. However where molded attachments are desired remote from the peripheral portion of the sheet or gasket, this necessarily increases the area of contact and between the molding apparatus and the sheet and extends the area of contact inwardly of the peripheral portion of the sheet toward the central region where greater sheet to sheet variations occur. With this increased and extended contact area, the glass sheets tend to exhibit increased breakage and cracking.

Accordingly, there is a need for a mold assembly and method for molding a remotely located attachment member on a sheet or panel that will accommodate a greater range of dimensional variations in the sheet or panel which are typically associated with the peripheral portion of the glass sheet and, therefore, reduce the breakage of the sheets during the molding process.

SUMMARY OF THE INVENTION

The present invention provides a mold assembly, as well as a molding method, in which a member is formed from flowable moldable material, including thermoplastic materials, such as PVC, or other resinous, or polymeric materials, around a remotely located attachment member on a sheet of material, such as glass, to secure the attachment member to the glass, without damaging or breaking the sheet, which provides a greater degree of flexibility and accommodation for variations in the sheet dimensions and shape.

In one form, the mold assembly for molding an attachment member on a sheet of material on an area of the sheet remote from the peripheral portion of the sheet includes first and second mold sections having first and second facing surfaces respectively. The facing surface of the first mold section includes a first sheet holding surface for holding the sheet thereon. The second mold section resiliently supports a movable, primary pressure pad, which includes a second sheet holding surface. A resilient member urges the movable, primary pressure pad towards the first mold section for holding the sheet between the first and second sheet holding surfaces. The mold assembly further includes a secondary pressure pad, which extends through at least a portion of the movable, primary pressure pad and is supported by one of the movable, primary pressure pad and the second mold section. The secondary pressure pad defines a mold cavity and is adapted to hold the attachment member remote from the peripheral portion of the sheet. At least one of the first and second mold sections includes a moldable material delivery system for directing moldable material to the mold cavity for forming a molded member around the attachment member and adhering the attachment member to the sheet.

In one aspect, the secondary pressure pad is supported by one of the primary pressure pad and the upper mold section on at least one guide. In a further aspect, the secondary pressure pad is positioned by one of the primary pressure pad and the upper mold section by a pin.

In another aspect, the secondary pressure pad is supported by the primary pressure pad. Preferably, the secondary pressure pad comprises a movable, secondary pressure pad, which is urged toward the lower mold section by a resilient member. The resilient member is interposed between the movable, primary pressure pad and the movable, secondary pressure pad. The resilient member may comprise an elastomeric resilient spring or a spring such as a helical spring, a Bellville spring, or the like. The movable, primary pressure pad includes a recess in which the movable, secondary pressure pad is movably supported and is adapted for limited movement in the recess. In this manner, the movable, secondary pressure pad accommodates variations in the sheet to minimize breakage and chipping.

In other aspects, the secondary pressure pad includes an attachment member recess adapted for holding the attachment member. The attachment member recess is preferably adapted to frictionally hold the attachment member. For example, the attachment member recess may be adapted to compress the attachment member to thereby frictionally hold the attachment member therein. Furthermore, the attachment member recess may include an alignment surface for guiding and aligning the attachment member therein. The alignment surface may include, for example, an annual shoulder for guiding and aligning the attachment member. In another aspect, the secondary pressure pad may include a third sheet holding surface adjacent the attachment mold cavity to provide a glass shut-off surface.

In another aspect, the secondary pressure pad is supported by the second mold section. Preferably, the secondary pressure pad is movably supported by the second mold section. Furthermore, the secondary pressure pad may be urged toward the lower mold section by a resilient member, which is interposed between the secondary pressure pad and the second mold section. Preferably, the secondary pressure pad includes a spring recess into which the resilient member extends.

In yet another aspect, the movable, primary pressure pad includes a transverse passage through which the secondary pressure pad extends. The secondary pressure pad includes a third pressure pad which is adapted for limited movement in the transverse passage of the movable, primary pressure pad. Preferably, the third pressure pad includes a third sheet holding surface and is urged toward the lower mold section by a resilient member.

In another form of the invention, a mold assembly for molding a moldable material on a peripheral portion of a sheet and around an attachment member remotely located from the peripheral portion of the sheet includes first and second mold sections having facing surfaces, which define a first mold cavity therebetween. The first mold section includes a first sheet holding surface. The second mold section includes a movable, primary pressure pad which includes a second sheet holding surface extending along and adjacent the first mold cavity. The mold assembly further includes at least one resilient member urging the movable, primary pressure pad toward the first mold section for holding the sheet between the first and second sheet holding surfaces. The secondary pressure pad is supported by one of the movable, primary pressure pad and the second mold section, which extends through at least a portion of the movable, primary pressure pad and includes a second mold cavity. The second pressure pad is adapted to hold the attachment member at a location remote from the first mold cavity during molding. At least one of the first and second mold sections includes a moldable material delivery system for delivering moldable material to the first and second mold cavities.

In one form, the first mold cavity is positioned for forming a molded member on the periphery of the panel, for example a molded gasket. The first mold cavity and second mold cavity preferably are in fluid communication so that the moldable material can flow from the first mold cavity to the second mold cavity to form the molded member around the attachment member.

In other aspects, the mold assembly includes at least one resilient member urging the secondary pressure pad toward the first mold section. Preferably, the resilient member for urging the movable, primary pressure pad has a stiffness which is greater than the stiffness of the resilient member urging the secondary pressure pad so that the secondary pressure pad can accommodate a wider range of dimensional variation in the sheet.

In another form, a method of molding an attachment member on a sheet includes providing an injection mold assembly which includes a first mold section and second mold section. The first and second mold sections define a mold cavity therebetween, and the second mold section includes a movable, primary pressure pad and a secondary pressure pad, with the secondary pressure pad including a second mold cavity. The secondary pressure pad is positioned to extend through at least a portion of the primary pressure pad. A sheet of material is positioned in the mold assembly between the first and second mold section such that the peripheral portion of the sheet extends into the first mold cavity. The sheet is held adjacent the peripheral portion between the first mold section and the primary pressure pad. The attachment member is held with the secondary pressure pad, which positions the attachment remote from the peripheral portion of the sheet. The moldable material is injected into the first and second mold cavities to thereby form a gasket on the peripheral portion of the sheet and to encapsulate the attachment member onto the sheet.

In one aspect, the moldable material is directed across a top surface of the sheet from the first mold cavity to the second mold cavity.

The improved apparatus and method disclosed herein provides for a mold apparatus with a secondary pressure pad which holds an attachment member while moldable material is injected into the mold apparatus so that the attachment member is to be adhered to the sheet in a remote location from the peripheral portion of the sheet. The secondary pressure pad accommodates a greater range of dimensional variation in the panel and may be supported by either the primary pressure pad or the second mold section itself.

BRIEF DESCRIPTION OF THE DRAWINGS

FIG. 5 is an enlarged sectional view of the closed mold assembly taken along line V—V of FIGS. 1 and 2 illustrating an injection gate;

FIG. 6 is a sectional view of a portion of the closed mold assembly taken along line VI—VI of FIGS. 1 and 2 illustrating a primary pressure pad supported within the upper mold section;

FIG. 7 is an enlarged sectional view taken along line VII—VII of FIGS. 1 and 2 illustrating a secondary pressure pad for holding an attachment member and locating the attachment member remotely from the periphery of the panel;

FIG. 7A is an enlarged sectional view of the attachment member held in the secondary pressure pad;

FIG. 8 is an enlarged sectional view similar to FIG. 7 illustrating a second embodiment of a secondary pressure pad;

FIG. 9 is a sectional view taken along line IX—IX of FIG. 8;

FIG. 10 is an enlarged sectional view similar to FIG. 7 illustrating a third embodiment of a secondary pressure pad;

FIG. 11 is an enlarged sectional view similar to FIG. 7 illustrating a fourth embodiment of a secondary pressure pad;

FIG. 12 is an enlarged sectional view similar to FIG. 7 illustrating a fifth embodiment of a secondary pressure pad;

FIG. 13 is an enlarged sectional view similar to FIG. 7 illustrating a sixth embodiment of a secondary pressure pad.

DESCRIPTION OF THE PREFERRED EMBODIMENTS

Figure 1:
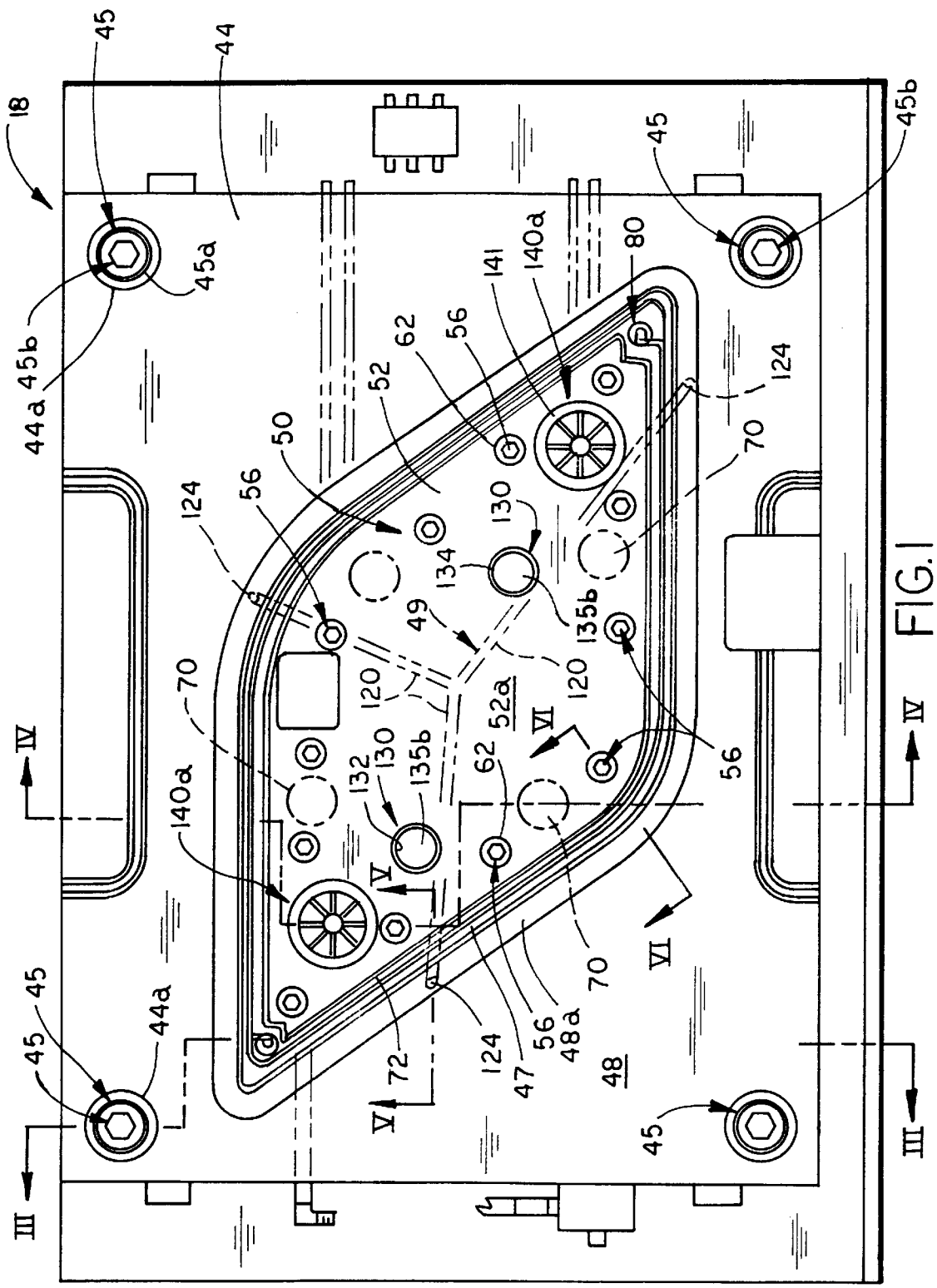
FIG. 1 is a plan view of an upper mold section of the present invention adapted for forming molded members around attachment members remotely located from the periphery of a panel by injection molding.

Referring now to the drawings in greater detail, FIGS. 1–7 illustrate a first embodiment of a mold assembly 10 of the present invention adapted for attaching an attachment member 12 to a configured, shaped non-porous sheet 14, such as a window panel, at a location remote from the periphery of such sheet by molding a polymeric member 15 around attachment member 12 and adhering attachment member 12 to sheet 14. Attachment member 12 is adhered to sheet 14 remote from the peripheral portion of sheet 14 so that sheet 14 can be mounted to the body of the vehicle by attachment member 12 inward of the peripheral portion of sheet 14. The peripheral portion of sheet 14 may also be encapsulated or molded with a peripheral casing or gasket 16 of a polymeric gasket material, such as polyvinyl chloride (PVC), thermoplastic rubber, thermoplastic urethane, reaction injection molded urethane, or the like.

Preferably, sheet 14 is a tempered or other strengthened, safety glass panel and may include a layer of black or opaque, ceramic frit on the same surface as the fastener and the gasket in order to obscure the view of the remote fastener and gasket when viewed from the opposite side of the assembly. If a layer of frit is applied to the glass sheet 14, the frit layer (not shown) is typically applied to a rear surface of the glass sheet during the glass sheet forming process, and forms the opaque or black, ceramic layer. The preferred ceramic paint is manufactured by Drakenfeld Color, Inc. of Washington, Pa. The paint includes small ceramic particles and suitable metal oxide pigment suspended in oil of a type conventionally known in the art applied to the glass surface and fired to fuse the paint to the glass.

Mold assembly 10 includes an upper mold portion 18 (FIGS. 1 and 3–6) and a lower mold portion 20 (FIGS. 2 and 3–6) which are interposed between and respectively mounted to upper and lower clamp plates 22 and 24 of a molding machine (not shown). The molding machine moves the lower mold portion 20 toward the upper mold portion 18 for holding sheet 14 therebetween and away from upper mold portion 18 at the end of the molding cycle.

Figure 2:
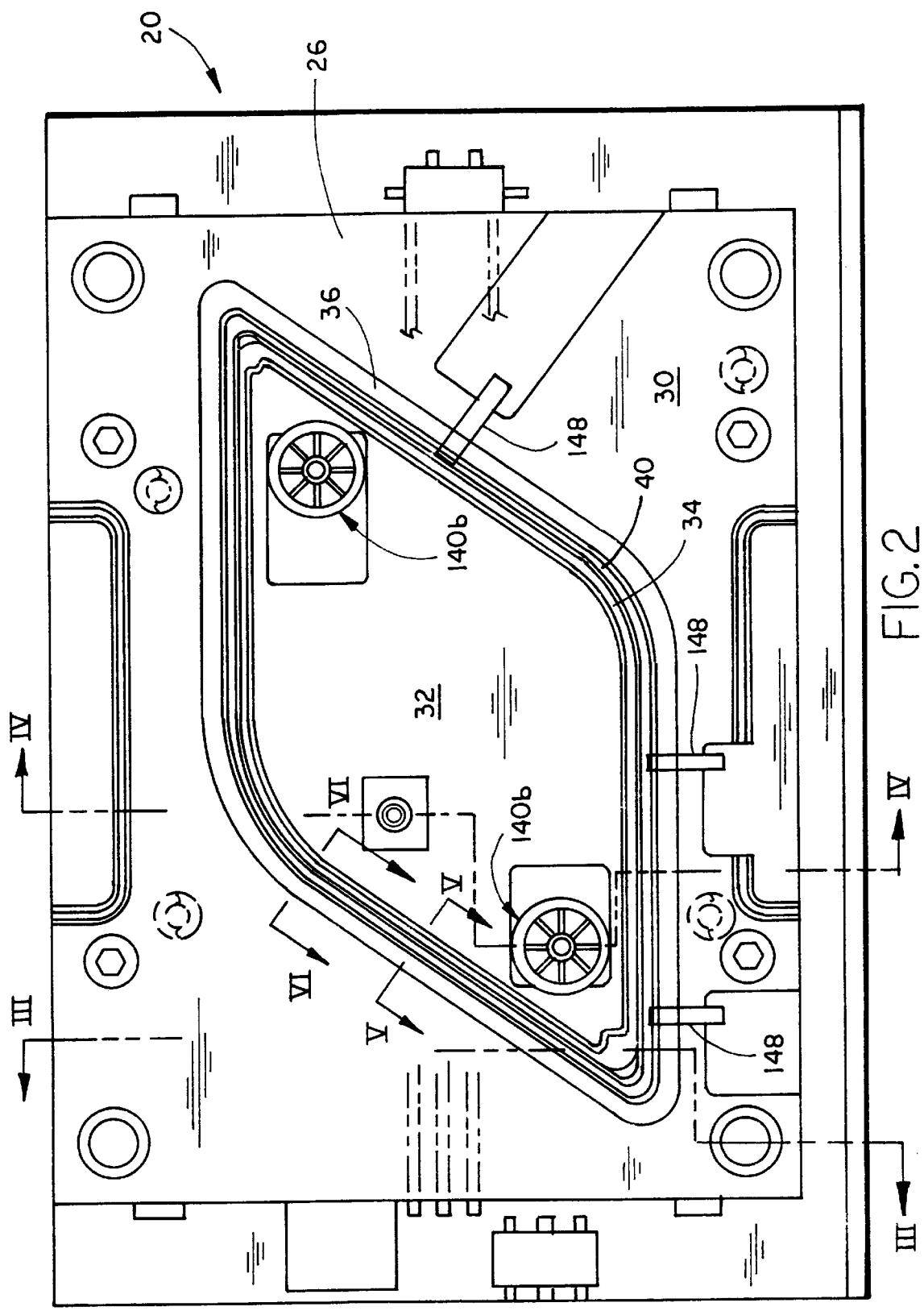
FIG. 2 is a plan view of a lower mold section of the present invention shown in FIG. 1.
Figure 3:
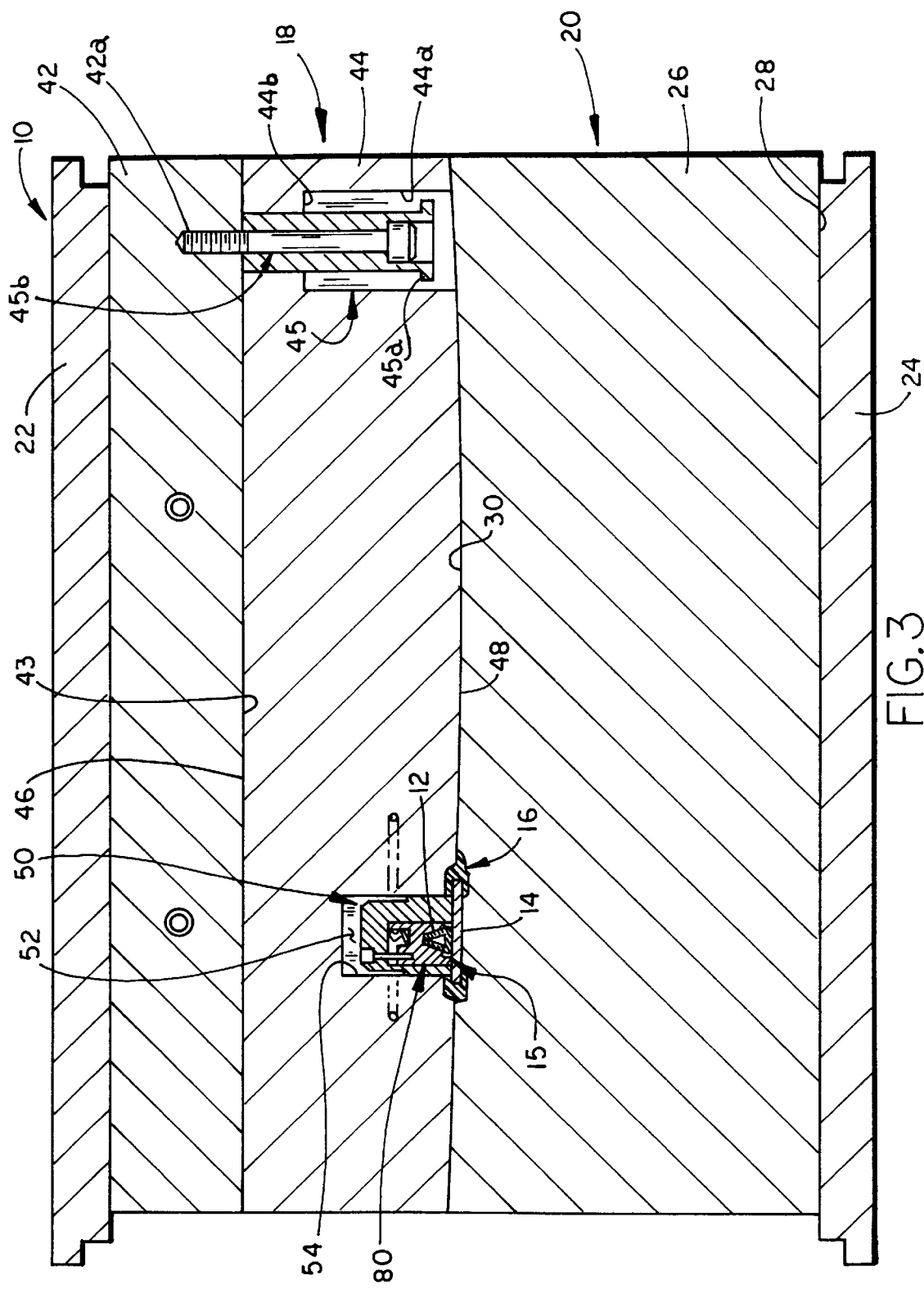
FIG. 3 is an enlarged sectional view of the closed mold assembly taken along line III—III of FIGS. 1 and 2.
Figure 4:
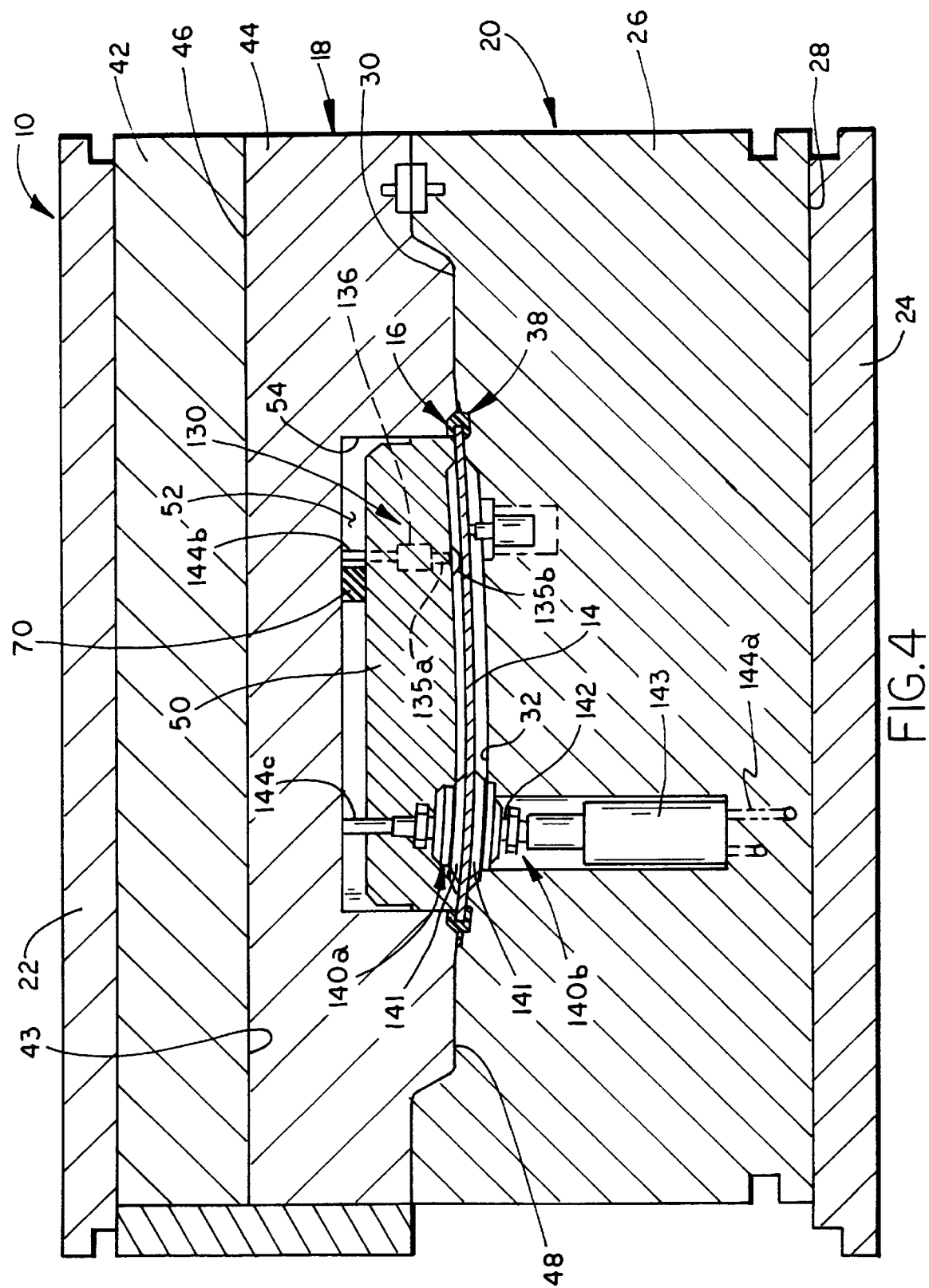
FIG. 4 is an enlarged sectional view of the closed mold assembly taken along line IV—IV of FIGS. 1 and 2.

As shown in FIGS. 1–3, lower mold portion 20 includes a lower mold section or cover plate 26 which is secured to lower clamp plate 24 by bolts 25 (FIG. 2). The lower surface 28 of lower mold section 26 is generally flat and rests on clamp plate 24 while the upper surface 30 includes a recess/relieved area 32, which accommodates different cord heights and variations in the shape of the sheet 14 when sheet 14 is closed in mold assembly 10 to reduce breakage, chipping, or damage (FIG. 4). Recessed area 32 may include a removable glass breakage tray (not shown) to collect pieces of glass for subsequent removal in the event that sheet 14 breaks during handling or the molding process. As best seen in FIG. 6, upper surface 30 of lower mold section 26 defines a first sheet holding surface 34, which holds sheet 14 during the molding process and provides a glass shut-off surface which confines the moldable material within cavity 38.

Referring to FIG. 2, extending around the periphery of recessed area 32 is a planar surface 36 defining the parting line between the upper and lower mold portions 18 and 20. Intermediate planar surface 36 and first sheet holding surface 34 is one side of mold cavity 38. Mold cavity 38 includes portions from both the upper and lower mold portions 18 and 20 and forms the casing or gasket 16 around the periphery of the glass sheet 14. As best seen in FIGS. 5 and 6, lower mold section 26 includes a lower mold cavity surface 40 having a curved configuration, which extends along and outlines the entire periphery of the glass sheet 14 when sheet 14 is mounted in the mold assembly 10. Cavity surface 40 of lower mold section 26 extends from a position spaced inwardly of the peripheral edge of the glass sheet 14, when mounted in the mold assembly, to a position outwardly of the glass periphery to form the full width of gasket or casing 16.

Referring to FIG. 3, upper mold portion 18 cooperates with lower mold portion 20 and includes an upper fixed support plate 42 to which an upper mold section 44 is movably supported by a plurality of flanged cylindrical members 45 which are provided around the periphery of upper mold section 44. Each cylindrical member 45 includes a flange 45a and is secured to fixed plate 42 by a shoulder bolt 45b, which extends into a respective cylindrical recess 42a provided in upper mold section 44. Flanged cylindrical members 45 permit upper mold section 44 to move up and down with respect to fixed plate 42 so that the injection channels of the runner system can be cleaned out between molding cycles, as will be more fully explained in reference to the runner system. However, flanged cylindrical members 45 limit the movement of upper mold section 44 when upper annular wall 44b of recess 44a abuts the flange 45b of cylindrical member 45.

Upper mold section 44 includes a planar upper surface 46 for engaging the upper fixed support plate 42 and a lower surface 48 extending around its periphery which also defines the parting surface for the upper mold portion 18. Planar upper surface 46 of upper mold section 44 and lower surface 43 of fixed support plate 42 each include corresponding grooves 46a and 43a, respectively (FIG. 5), which cooperate together when mold assembly 10 is closed to define a runner system 49 for delivering the moldable material to mold cavity 38 and to attachment member 12, as will be more fully explained. Lower surface 48 includes an upper mold cavity surface 47 and a parting surface 48a which engages planar upper surface 36 of lower mold section 26 (FIGS. 5–7) to seal off the flow of gasket material from mold cavity 38. Upper mold cavity surface 47 has a curved configuration, which extends around and outlines the entire periphery of sheet 14 when sheet 14 is placed in mold assembly 10 and, together with lower cavity surface 40, defines mold cavity 38.

In order to prevent compression, fracture, or other damage to the supported glass sheet 14 when glass sheet 14 is inserted within the mold assembly 10, upper mold section 44 includes a rigid, movable, primary mold portion or pressure pad 50. As best seen in FIGS. 4 and 6, movable, primary pressure pad 50 is mounted within a central recess 52, which is defined between generally vertical walls 54 formed in the upper mold section 44. Pressure pad 50 has an outline corresponding in shape to the periphery of sheet 14 which will ultimately form the window assembly and preferably comprises a steel pad, such as P-20 steel. Primary pressure pad 50 is supported by upper mold section 44 and is slidably mounted within recess 52 between walls 54 on a series of downwardly extending shoulder bolts 56 (FIG. 6), which are mounted at spaced locations around the periphery of the pressure pad 50 (FIG. 1). Bolts 56 provide guides and are threaded into apertures 44c in an upper surface 52a of recess 52 (FIG. 6) and extend through corresponding cylindrical bores 58 provided in primary pressure pad 50. As best seen in FIG. 6, bolts 56 include enlarged heads 60 which are received in larger cylindrical recesses 62 formed in pressure pad 50 to provide stops. In this manner, when pressure pad 50 moves down the shanks 64 of bolts 56, enlarged heads 60 will engage the upper annular walls 66 of cylindrical recesses 62 to limit the downward movement of primary pressure pad 50.

To urge pressure pad 50 toward the lower mold section 26, a plurality of resilient members 70 (FIGS. 1 and 6), for example a spring, such as a coil spring, or an elastomeric member, such as a urethane disc, are interposed between pressure pad 50 and upper surface 52a of the recess 52. The lower surface of primary pressure pad 50 includes a second holding surface 72 which is contoured to follow the shape of sheet 14 and engages a portion adjacent the peripheral portion of sheet 14 generally in opposition to holding surface 34 on lower mold portion 20. Holding surface 72 provides a glass shut-off surface confining the moldable material to cavity 38 so that the moldable material will not flow onto the viewing area of glass sheet 14. Each spring 70 is aligned to urge pressure pad 50 outwardly from upper mold section 44 toward sheet 14 to grip sheet 14 between holding surfaces 34 and 72. Resilient members 70 preferably comprise elastomeric members, such as urethane discs, but may also comprise conventional coil springs, hydraulic cylinders, pneumatic bladders, or any other resilient member that may be substituted for springs 70 to provide appropriate biasing force for primary pressure pad 50 against the glass sheet 14.

The central area of the lower, glass facing side of the pressure pad 46 includes a recess/relieved area 74 (FIG. 4) which extends inwardly from the inner periphery of holding surface 72. Accordingly, when the upper and lower mold sections 44 and 26 are closed, primary pressure pad 50 is urged toward glass sheet 14 by resilient member 70 and firmly positions glass sheet 14 against holding surface 34 of lower mold section 26 with a periphery of the sheet extending into mold cavity 38. Furthermore, in addition to absorbing variations in sheet 14, the resiliency of primary pressure pad 50 due to resilient disc members 70 also helps eject the completed molded window assembly from the mold after formation when the mold is opened.

As seen in FIGS. 3 and 7, molding apparatus 10 further includes at least one secondary pressure pad 80 for holding attachment member 12 which is to be adhered to an upper surface 14a of sheet 14 by molding and a quantity of moldable material. Secondary pressure pad 80 preferably comprises a steel pad, for example P-20 steel. Alternatively, secondary pressure pad 80 may comprise a thermoplastic, for example polyethylene terephthalate (PET), or a thermo elastomer, which allow secondary pressure pad 80 to absorb variations in sheet 14. In the illustrated embodiment, attachment member 12 comprises a clip, but it should be understood that other attachment members, such as bolts, studs, threaded fasteners, or the like, may be used in conjunction with this mold apparatus. Attachment member 12 is held and located by secondary pressure pad 80 remote from peripheral portion or edge of sheet 14 and, optionally, from gasket 16. In the illustrated embodiment, secondary pressure pad 80 holds attachment member 12 at or near the upper surface 14a of sheet 14 in a variable location so that the variations in sheet 14 can be accommodated. However, it should be understood that secondary pressure pad 80 may suspend attachment member 12 above upper surface 14a of sheet 14 in a like manner so that the moldable material flows freely under attachment member 12 to encapsulate attachment member 12.

Referring to FIG. 7a, attachment member 12 includes a base 84 with a plurality of spaced, resiliently arms 86, which extend from base 84 and are connected at their distal ends to form a conical shaped, compressible member 88. When adhered to the back surface of a window panel, attachment member 12 enables the panel to be mechanically secured to the body of the vehicle. When compressible member 88 is inserted in an opening provided in the body of the vehicle, which is smaller in diameter than the compressible member, the opening compresses member 88 until compressible member can be fully extended through the opening. Thereafter, compressible member 88 expands and holds the panel in place without the use of tools.

Referring to FIGS. 7 and 7a, attachment member 12 is held in a recess 90 provided in secondary pressure pad 80. Secondary pressure pad 80 includes a third sheet holding surface 91 which extends around recess 90 and provides a glass shut-off surface to prevent the flow of the moldable material across sheet 14. Recess 90 includes a conical-shaped cavity 92 adapted to compress resilient arms 86 so that attachment member 12 is frictionally, but releasably, held by secondary pressure pad 80 during the molding process. To align attachment member 12, cavity 92 includes an inner annular shoulder 94 which guides attachment member 12 into proper alignment within recess 90 so that attachment member 12 will be properly aligned on upper surface 14a of panel 14. Recess 90 further includes an enlarged annular cavity 96 which defines a second mold cavity. Cavity 96 extends around cavity 92 intermediate third sheet holding surface 91 and conical-shaped cavity 92 for receiving the moldable material and for forming the molded member 15 around base 84 of attachment member 12. During molding, attachment member 12 is pressed against sheet 14. This pressure forces base 84 against secondary pressure pad 80 around the perimeter of cavity 92 to prevent the moldable material from flowing into cavity 92. For further details of other attachment members which may be used with this invention, reference is made herein to U.S. Pat. Nos. 4,861,540 and 4,700,525 to Kenneth A. Nieboer et al., both of which are assigned to Donnelly Corporation of Holland, Mich. After the molding process is complete and molded member 15 is sufficiently cured, attachment member 12 will be released from the frictional hold of cavity 92 by the weight of sheet 14.

As best seen in FIG. 7a, base 84 may include a plurality of compressible spacer members 98 which project from the lower surface of base and space attachment member 12 from sheet 14 so that the moldable material flows freely under and over base 84 to fully encapsulate base 84 to adhere attachment member 12 to sheet 14. Furthermore, when secondary pressure pad 80 pushes attachment member 12 against sheet 14, spacer members 98 preferably compress under the force of secondary pressure pad 80 and, therefore, provide additional absorption of variations in the sheet (14). Similarly, reference is made to U.S. Pat. Nos. 4,861,540 and 4,700,525 for further general details of molding around an attachment member. Moreover, base 84 may include one or more annular grooves 100, which extend around the periphery of base 84. Grooves 100 are dimensioned to permit the moldable material to flow into grooves 100 and thereby provide further mechanical interlocking of molded member 15 and attachment member 12.

Referring to FIG. 7, in a preferred form, secondary pressure pad 80 is movably supported by primary pressure pad 50 in a recess 102 and extends through at least a portion of primary pressure pad 50 to position attachment member 12 in a variable location with respect to the upper mold section and remote from the peripheral portion of sheet 14 and gasket 16. In order to direct the moldable material to annular cavity 96 and to attachment member 12, primary pressure pad 50 and secondary pressure pad 80 each include relief surfaces 104, 106 (FIG. 7) which permit the flow of the moldable material from the peripheral gasket 16 along the surface of sheet 14 to attachment member 12. After the moldable material has at least partially cooled and set, these relief passages (104, 106) form runners which can be subsequently removed from sheet 14 after mold apparatus 10 is opened and sheet 14 is removed from mold apparatus 10.

In order to urge secondary pressure pad 80 toward sheet 12, mold assembly 10 includes a resilient member 108, such as a conventional coil spring. Resilient member 108 extends between an upper surface 102a of recess 102 and secondary pressure pad 80. One end 108a of resilient member 108 is confined in a recess 80a provided in secondary pressure pad 80 to guide and retain resilient member 108 in position. Preferably, resilient member 108 comprises a conventional metal spring, for example a helical spring, Bellville spring or the like, and, more preferably, an elastomeric member, such as a urethane disc. But it should be understood that resilient member 108 may comprise a hydraulic cylinder, pneumatic bladder, or other resilient members that may be substituted for the metal spring or elastomeric member.

Secondary pressure pad 80 is movably/slidably supported in recess 102 by a shoulder bolt 110. Shoulder bolt 110 includes a threaded portion 112, which is threadingly engaged with secondary pressure pad 80, a shaft portion 113, which extends through a transverse bore 114 provided in primary pressure pad 50, and an enlarged head 116. Enlarged head 116 is aligned in a larger cylindrical bore 118, which is coaxial with transverse bore 114, and provides a stop to limit the vertical movement of secondary pressure pad 80 in recess 102 in a similar manner to shoulder bolt 56. As a result, secondary pressure pad 80 may accommodate greater variations in the dimensions of sheet 14, particularly, inwardly of the peripheral portion of sheet 14 where secondary pressure pad 80 is positioned. Therefore, the location of recess 90 varies with respect to the upper mold section but provides a fixed volume for cavity 96 so that molded member 15 will have uniform characteristics regardless of the variations in sheet 14. The amount of variation that secondary pressure pad 80 can accommodate is a function of the weight of the secondary pressure pad, in the case of a vertically oriented mold assembly, and the spring force exerted by resilient member 108. It can be appreciated from the foregoing that by varying the spring constants of resilient members 70 and 108, which are in series in this embodiment, the amount of glass variation accommodated by mold assembly 10 can be adjusted. This variation is, however, affected by the amount of flash or over flow of the moldable material that is desired. In the illustrated embodiment, two secondary pressure pads 80 are provided in mold assembly 10 (see FIG. 1), but it should be understood that one or more than two secondary pressure pads 80 may be provided where one or more than two attachment members are desired.

After sheet 14 is loaded onto lower mold portion 20 and properly aligned on holding surface 34 of lower mold section 26, lower clamp plate 24 is moved by the molding machine (not shown) toward upper mold portion 18. As sheet 14 is pressed against second sheet holding surface 72 of primary pressure pad 50 and third sheet holding surface 91 of secondary pressure pad 80, upper mold section 44 is urged toward fixed plate 42, guided by cylindrical members 45. When mold assembly 10 is completely closed, upper surface 46 of upper mold section abuts lower surface 43 of fixed plate 42, at which point the moldable material may be injected into mold apparatus 10.

During closing, holding surface 72 of primary pressure pad 50 engages the peripheral portion of upper surface 14a of the sheet 14 and forces sheet 14 against holding surface 34 of lower mold section 26 to shut off and close cavity 38 against the glass surface. The spring force of the resilient members 70 for primary pressure pad 50 is chosen to be sufficient enough to seal off and prevent flash or overflow of the moldable material from cavity 38 to the viewing area of the glass but not so strong as to break the glass. Spring pressure may be adjusted with shims, spacers, or substitution of different resilient members with different spring constants. Preferably, the spring constant of resilient member 108 is greater than the spring constants of any one of resilient member 70. In a similar manner, secondary pressure pad 80 is urged toward upper surface 14a of sheet 14 to hold and position attachment member 12. The force of spring 108 is chosen to be sufficient to seal off and prevent flash or overflow of the moldable material beyond molded member 15.

After mold assembly 10 is closed, the upper mold section 44 is clamped with conventionally known apparatus in the molding machine at a clamping pressure adequate to control flash or overflow. Typically, such pressures are in the range of 400 to 600 tons for larger rearview windows and 200 to 400 tons for smaller side windows, depending on the projected area of the gasket to be formed. In PVC molding, the molten gasket material is injected into the mold cavity 18 at approximately 2,000 to 5,000 psi. In contrast with reaction injection molding of urethane, the components forming gasket 16 and molded member 15 are injected into mold apparatus 10 in a range of about 2,000 psi to 5,000 psi. In order to monitor glass breakage, which can occur under such pressure, mold assembly 10 includes a glass breakage sensor 119, which is preferably positioned in a lower mold section 26.

As shown in FIGS. 2, 3, 5, and 7, after mold portions 18 and 20 are clamped, moldable material, which preferably comprises a thermoplastic material such as PVC, is injected into mold cavity 38. The molten gasket material is delivered to the mold cavity 38 by runner system 49. Runner system 49 in the illustrated embodiment comprises a cold runner system. But it should be understood that mold assembly 10 may alternatively include a hot runner system. Referring to FIGS. 1 and 5, runner system 49 includes a plurality of channels 120 formed by grooves 43a and 46a formed in fixed plate 42 and upper mold section 44, respectively. Channels 120 extend from an inlet port (not shown) provided in the upper mold portion 18 to mold cavity 38 through a plurality of injection gates 124 (FIGS. 1 and 5), which are positioned along the periphery of primary pressure pad 50 and are positioned at spaced positions along and above cavity 38 (FIG. 5).

As best seen in FIG. 5, gates 124 comprises plug gates which extend from the channel 120 downwardly to a portion adjacent mold cavity 38. Each gate 124 generally includes a first elongated, tapering passage way 126a and a second elongated passageway 126b. Passageway 126a includes a first cross section at the juncture of passageway 126a and the channel 120 and a second smaller cross section at the juncture of passageway 126a and second elongated passageway 126b. During the injection process, cooling water is delivered through a system of water passages (not shown), provided in upper and lower mold portions 18 and 20 (FIGS. 10 and 11) to cool upper and lower mold sections 44 and 26 and the injected molten gasket material. This allows the gasket material to solidify in channels 120 and in gates 124. After the molding process is complete and the moldable material is solidified, upper mold section 44 is lowered on cylindrical members 45 and moves away from the lower surface of fixed plate 42 to allow access to channels 120. At which point, the moldable material in channels 120 and passageway 126a can then be manually removed prior to the next mold cycle. The portion of the solidified gasket material which remains in passageway 126b is then trimmed from gasket 16.

As described previously, primary pressure pad 50 and secondary pressure pad 80 each include relief surfaces 104 and 106, respectively, to direct the moldable material from mold cavity 38 to enlarged annular cavity 96 in secondary pressure pad 80 to form molded member 15 around attachment member 12. After the molding process is complete, the moldable material forms runners 152 on the upper surface 14a of sheet 14, which extends between gasket 16 and molded member 15. Runners 152 are preferably trimmed from sheet 14 so that the sheet 14 is free of moldable material between gasket 16 and molded member 15.

The separation of the glass sheet 14, with molded member 15 and molded gasket 16, from the mold assembly 10 after molding is achieved by cooperating ejection assemblies 130 (FIG. 1), which are secured in recesses 132 and 134 provided in primary pressure pad 50. As best seen in FIG. 4, each of the ejector assemblies 130 is generally identical and includes a rod 135a and an ejection pad 135b, which is secured to the distal end of rod 135a. Rods 135a and their respective ejector pads 135b are extended outwardly from upper mold section 44 through primary pressure pad 50 by an air operated cylinder 136 upon opening the mold assembly 10. Mold assembly 10 further includes upper and lower suction cup assemblies 140a and 140b to hold glass sheet 14 in place during the molding process and while the upper mold section 44 is raised. Suction cup assemblies 140a and 140b each include a suction cup 141 which have an outer surface that will not scratch or mar the surface of the glass sheet when moved into contact with the glass and are actuated by evacuation of air to grip the sheet of glass 14. The lower suction cups 141 are each mounted on a rod 142 of a pneumatic cylinder 143 to extend and retract the respective suction cup 141 so that sheet 14 may be lifted off lower mold section 26. Air is supplied to or removed from the suction cups 141 and cylinders 136, 143 by conduits 144a, 144b, and 144c. Lower suction cups 141 are preferably actuated to hold the underside of the glass sheet 14 when the glass sheet 14 has been placed in the mold and aligned with the glass holders 148 so that glass sheet 14 is held stationary by the suction cups 141 during the molding and encapsulation process. This ensures that sheet 14 will not shift during the molding process.

When mold assembly 10 is opened, conventionally known controls deliver the air to conduit 144b to actuate air cylinders 136 of upper ejector assemblies 130 to extend rods 135a and ejector pads 135b outwardly to contact glass sheet 14 to separate glass sheet 14 from secondary sheet holding surface 72 of primary pressure pad 50 and from third sheet holding surface 91 of secondary pressure pad 80 especially if there is any suction or vacuum created behind the glass surface. Furthermore, ejector assemblies 130 separate gasket 16 from the mold cavity 38 and molded member from cavity 96. Thereafter, when the lower mold section 26 is moved away from upper mold section 44, the lower suction cup assemblies 140b are actuated by conventionally known controls to extend rods 142 and lift the entire modular window assembly from holding surface 34 of lower mold section 26 and allow an operator to manually remove the capsulated sheet of glass 14 from mold assembly 10. Suction cups 141 help retain glass sheet 14 in place so that it can then be removed by an operator.

As shown in FIGS. 8–9, a second embodiment 200 of the mold assembly is illustrated. Mold assembly 200 is generally similar to the mold assembly 10 and includes an upper mold portion 218 and a lower mold portion 220, which define a mold cavity 238 therebetween. Lower portion 220 of mold assembly includes a lower mold section 226 having a first sheet holding surface 234 for supporting sheet 14 thereon during molding. Upper portion 218 of mold assembly 200 includes an upper mold section 244 and a primary pressure pad 250, which is movably mounted in the upper mold section 244 in a recess 252. In a similar manner to the previous embodiment, primary movable pressure pad 250 includes a second sheet holding surface 272 and a secondary pressure pad 280 for holding and positioning attachment member 12 on sheet 14 remote from the peripheral portion or gasket 16 of sheet 14 so that molded member 15 may be formed around attachment member 12 to adhere attachment member 12 to sheet 14 remote from the peripheral edge or gasket 16.

Secondary pressure pad 280 includes a third sheet holding surface 291 for bearing against sheet 14, which provides a glass shut-off surface, and a recess 290 for holding attachment member 12. Similar to the previous embodiment, recess 290 includes a conical shaped cavity 292 adapted to frictionally hold attachment member 12 therein during the molding process and a second mold cavity 296 for forming molded member 15 around attachment member 12. Preferably, cavity 292 includes an annular shoulder 294 for guiding and aligning attachment member in recess 290.

As best seen in FIGS. 8 and 9, secondary pressure pad 280 is supported by primary pressure pad 250 in a recess 202 provided in primary pressure pad 250 on a shoulder bolt 210 and positioned or guided by a pin 211. Primary pressure pad 250 is urged or biased toward sheet 14 by resilient members 270, such as springs, elastomeric members, or the like, which in turn urge secondary pressure pad 280 toward sheet 14 via primary pressure pad 250. In this manner, secondary pressure pad 280 is urged toward sheet 14 by resilient members 270 and moves with primary pressure pad 250. Variations in the sheet are, therefore, absorbed either by spacer members 98 of attachment member 12 or by compression of secondary pressure pad 280 or both in series with resilient members 270. Consequently, spring 270 provides a variable location for attachment member 12 with respect to the upper mold section and a fixed volume for cavity 296. Pressure pad 280 is preferably formed from a material with a lower stiffness than primary pad 250 so that it will slightly compress under the force of primary pressure pad 250 against sheet 14 and exert a different pressure on sheet 14 in the vicinity of attachment member 12. For example, secondary pressure pad 280 may be preferably formed from a thermoplastic or thermo elastomer. As described above, secondary pressure pad 280 preferably responds to dimensional variations in sheet 14 by compressing. Therefore, it can be appreciated that the degree of variation which can be absorbed by pad 280 and/or members 98 is a function of their respective materials and that the amount of variation absorbed by secondary pressure pad 280 can be adjusted to accommodate numerous applications. However, with lower stiffness, secondary pressure pad 280 may produce a greater amount of flash or overflow of the moldable material onto sheet 14 in the vicinity of attachment member 12. However, this flash or overflow can be subsequently trimmed. Alternatively, pressure pad 280 can be removed and ground down or "spotted" to suit individual applications.

Referring to FIG. 10, a third embodiment 300 of the mold assembly is illustrated. Mold assembly 300 is generally similar to the mold assembly 10 and includes an upper mold portion 318 and a lower mold portion 320, which define a mold cavity 338 therebetween. Lower mold portion 320 of mold assembly 300 includes a lower mold section 326 having a first sheet holding surface 334 for supporting sheet 14 thereon during molding. Upper mold portion 318 of mold assembly 300 includes an upper mold section 344 and a movable primary pressure pad 350 which is movably mounted in the upper mold section 344 in a recess 352 and urged toward lower mold section 326 by a plurality of resilient members or discs 370. In a similar manner to the previous embodiment, primary pressure pad 350 includes a second sheet holding surface 372 and a secondary pressure pad 380 which extends through pressure pad 350 for holding and positioning attachment member 12 on sheet 14 remote from the peripheral portion or gasket 16 of sheet 12.

Secondary pressure pad 380 includes a third sheet holding surface 391 for bearing against sheet 14, which provides a glass shut-off surface, and a recess 390 for holding attachment member 12 remote from the peripheral portion of sheet 14. Recess 390 includes an annular cavity 396 for receiving molding material for forming molded member 315 around base 84 of attachment member 12 to adhere attachment member 12 onto the upper surface 14a of sheet 14. As best seen in FIG. 10, secondary pressure pad 380 is movably supported by upper mold section 344 in recess 352 on a shoulder bolt 310. In this manner, secondary pressure pad 380 moves independently of primary pressure pad 350. Furthermore, secondary pressure pad 380 is biased toward sheet 14 by a resilient member 308, such as a spring or an elastomeric member or the like, which is positioned between upper surface 352a of recess 352 and secondary pressure pad 380. Resilient member 308 is preferably captured in a recess 380a provided in an upper portion 380b of secondary pressure pad 380. In this embodiment, resilient members 370 and 308 are in parallel which permits independent adjustment of the respective pressure pads. Similar to the first and second embodiments, secondary pressure pad 380 provides a variable location for cavity 390 with respect to the upper mold section and provides a fixed volume for annular cavity 396 so that molded member 15 will generally have uniform characteristics regardless of the variation in sheet 14.

According to a fourth embodiment of the invention illustrated in FIG. 11, a mold assembly 400 includes an upper mold portion 418 and a lower mold portion 420, which define a mold cavity 438 therebetween. Lower mold portion 420 of mold assembly 400 includes a lower mold section 426 having a first sheet holding surface 434 for supporting sheet 14 thereon during molding. Upper mold portion 418 of mold assembly 400 includes an upper mold section 444 and a movable primary pressure pad 450, which is movably mounted in the upper mold section 444 in a recess 452 and urged toward lower mold section 426 by a plurality of resilient members or discs 470. In a similar manner to the previous embodiments, primary pressure pad 450 includes a second sheet holding surface 472 for holding sheet 14 and forming a shut-off surface for cavity 438, and a secondary pressure pad 480 for holding and positioning attachment member 12 on sheet 14 remote from the peripheral portion or gasket 16 of sheet 14.

Similar to the previous embodiments, secondary pressure pad 480 includes a recess 490 for holding attachment member 12 remotely from the peripheral portion of sheet 14 and a third sheet holding surface 491 for bearing against sheet 14. Third sheet holding surface 491 provides a glass shut-off surface for the cavity 496 surrounding the base of attachment member 12 and forming molded member 15. In this particular embodiment, secondary pressure pad 480 is fixed and is supported by upper mold section 444 on a shoulder bolt 410 and positioned or guided by a pin 411 in recess 452. Consequently, primary pressure pad 450 moves independently of secondary pressure pad 480 and cavity 490 is in a fixed location with respect to upper mold section. In a similar manner to mold assembly 200, secondary pressure pad 480 absorbs variation in sheet 14 either by the compression of spacer members 98 of attachment member 12 or by compression of secondary pressure pad 480 or both. Therefore, secondary pressure pad 480 preferably comprises a compressible material, such as a thermoplastic or thermo elastomer, which has a lower stiffness than primary pressure pad 450. In contrast to the previous embodiments, however, secondary pressure pad 480 provides a variable cavity or volume for annular cavity 496. As a result, molded member 15 may have varying characteristics which reflect the variations in sheet 14.

Referring to FIG. 12, a fifth embodiment a mold assembly 500 is shown. Mold assembly 500 includes a upper mold portion 518 and a lower mold portion 520, which together define a mold cavity 538 therebetween. Lower mold portion 520 of mold assembly includes a lower mold section 526 having a first sheet holding surface 534 for supporting sheet 14 thereon during molding. Upper mold portion 518 of mold assembly 500 includes an upper mold section 544 and a movable primary pressure pad 550, which is movably mounted in the upper mold section 544 in a recess 552 and urged toward lower mold section by a plurality of resilient members or discs 570. In a similar manner to the previous embodiments, pressure pad 550 includes a second sheet holding surface 572 for holding sheet 14 and a secondary pressure pad 580 for holding and positioning attachment member 12 on sheet 14 remote from the peripheral portion or gasket 16 of sheet 14.

Secondary pressure pad 580 includes a recess 590 for holding attachment member 12 remotely from the peripheral portion of sheet 14 and a lower surface which defines a second mold cavity 596. As best seen in FIG. 12, secondary pressure pad 580 is supported by upper mold section 544 on a shoulder bolt 510 and positioned or guided by a pin 511. Therefore, primary pressure pad 550 moves independently of secondary pressure pad 580. As a result, second mold cavity 596 has volume that varies in response to variations in sheet 14 and secondary pressure pad 580 holds attachment member 12 in a fixed position. Therefore, the variations in sheet 14 are absorbed by spacer members 98 and/or compression of pressure pad 580, which preferably comprises a compressible material such as a thermoplastic or thermo elastomer.

In order to reduce the flash on sheet 14, the contact between secondary pressure pad 580 and sheet 14 is minimized or eliminated. Secondary pressure pad 580 includes narrow attachment holding portion 580a and a wider upper mounting portion 580b, which defines a shoulder 591.

Recess 590 is provided in holding portion 580a, which defines second mold cavity 596 for forming molded member 15 around attachment member 12. As best seen in FIG. 12, primary pressure pad 550 includes a stepped passageway 550a through which secondary pressure pad 580 extends from upper mold section 544 to sheet 14 and includes a corresponding shoulder 550b spaced from shoulder 591. In this manner, when primary pressure pad 550 moves in response to variations in sheet 14, the space between shoulders 550b and 591 will accommodate the relative movement of primary pressure pad 550 toward secondary pressure pad 580.

Again, similar to the previous secondary pressure pads, secondary pressure pad 580 may comprise a compressible material, such as a thermoplastic or a thermo elastomer. Therefore, the compression of secondary pressure pad 580 and/or members 98 absorbs the variations in sheet 14. However, since secondary pressure pad 580 is not in contact with sheet 14, most of the variation in sheet 14 is absorbed by members 98. As a result, the height of molded member 15 may vary as sheet 14 moves relative to cavity 596 in secondary pressure pad 580.

According to yet another embodiment of the invention shown in FIG. 13, a mold assembly 600 includes an upper mold portion 618 and a lower mold portion 620, which together define a mold cavity 638 therebetween. Lower mold portion 620 of mold assembly 600 includes a lower mold section 626 having a first sheet holding surface 634 for supporting sheet 14 thereon during molding. Upper mold portion 618 of mold assembly 600 includes an upper mold section 644 and a movable primary pressure pad 650, which is movably mounted in the upper mold section 644 in a recess 652 and urged toward lower mold section by resilient members or discs 670. In a similar manner to the previous embodiments, pressure pad 650 includes a second sheet holding surface 672 for holding sheet 14 and a secondary pressure pad 680 for holding and positioning attachment member 12 on sheet 14 remote from the peripheral portion or gasket 16 of sheet 14.

Secondary pressure pad 680 includes a recess 690 for holding attachment member 12 remotely from the peripheral portion of sheet 14 and a lower surface 691a which defines an upper surface of a second mold cavity 696 for forming molded member 15 around attachment member 12. Furthermore, secondary pressure pad 680 includes a wider upper mounting portion 680a and a narrower attachment holding portion 680b, which includes recess 690. Secondary pressure pad 680 is supported by upper mold section 644 on a shoulder bolt 610 and a pin 611, which provides a fixed position for cavity 690 and attachment member 12 and is, therefore, independent of primary pressure pad 650. Primary pressure pad 650 includes a corresponding passageway 650a through which secondary pressure pad 680 extends from upper mold section 644 to sheet 14.

Figure 14:
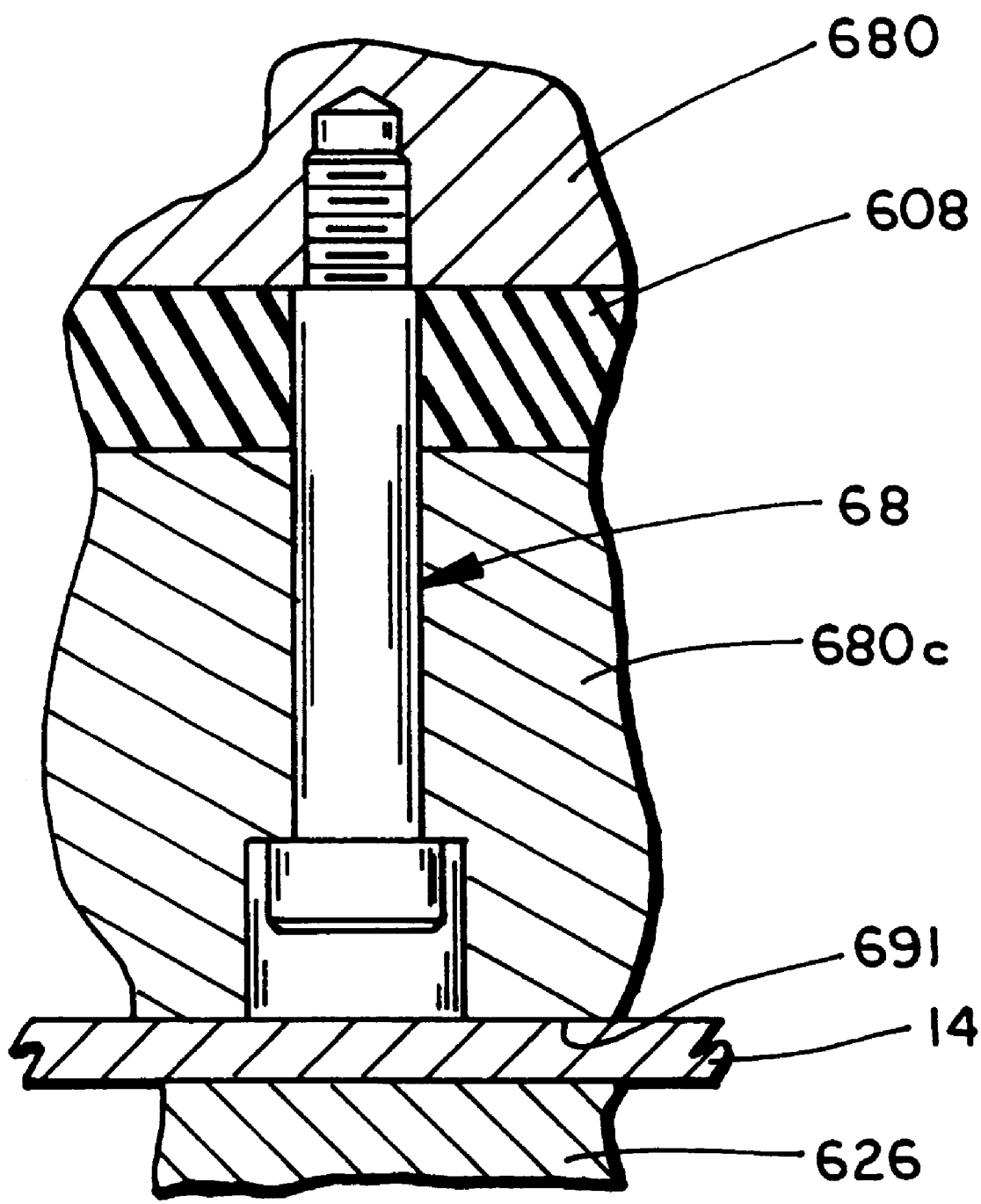
FIG. 14 is an enlarged sectional view taken along line XIV—XIV of FIG. 13.

Referring to FIGS. 13 and 14, secondary pressure pad 680 includes an annular tertiary pad 680c which is supported on secondary pressure pad 680 by at least one guide 680d, for example a shoulder bolt or pin with an enlarged head forming a shoulder. Tertiary pad 680c includes a third sheet holding surface 691 and is urged toward lower mold section 626 by an annular resilient member 608 to provide a glass shut-off surface to prevent the flow of the moldable material from second mold cavity 696 across sheet 14. Resilient member 608 is interposed between a shoulder 691b defined by upper mounting portion 680a and an upper surface of tertiary pad 680c. Resilient member 608 is preferably an elastomeric member, such as a urethane ring. But it should be understood that resilient member 608 may also comprise a spring, for example a helical spring, a Bellville spring, or the like, a hydraulic cylinder, or other resilient members. In this manner, attachment member 12 is held in a fixed position relative to upper mold section 618 while tertiary pressure pad 680c is movable in passageway 650a to absorb variations in sheet 14. In addition, spacer members 98 of attachment member 12 may absorb variations in sheet 14. Similar to mold assembly 500, cavity 696 has a volume that varies in response to variation in sheet 14. As a result, the height of molded member 15 may vary.

Accordingly, the invention provides mold assemblies and methods useful in making modular window assemblies and other products with an attachment member adhered to the sheet material by a molded member which is formed remote from the periphery of the sheet without breakage or fracturing the sheet material held therein. A gasket, casing, or other molded portion may be molded onto the sheet extending around the periphery of the sheet material. In some aspects, the molded portions may have uniform dimension characteristics despite the variation in the sheet of glass and the location of the attachment may be variable with respect to the mold assembly but fixed with respect to the sheet. In yet other aspects, the molded portions may exhibit variable dimensional characteristics and the location of the attachment may be fixed with respect to the mold assembly but variable with respect to the sheet. The invention allows a sheet of glass to be suspended in the mold assembly while a molded member is formed around the attachment member and the periphery of the sheet is molded with a gasket, casing or moldable material. The mold assembly accommodates greater variation in the sheet while controlling with varying degrees the "flash" or overflow of the gasket material onto the sheet.

For the purposes of the following description, the terms "up," "down," "upper," "lower," "vertical," "horizontal," and derivatives or equivalents thereof shall relate to the invention as oriented in FIGS. 1 to 14. It is understood that the invention may assume various alternative orientations, except where expressly specified to the contrary. For example, the mold apparatus 10, 200, 300, 400, 500, or 600 may assume a horizontal orientation rather than the vertical orientation shown in the drawings. Furthermore, the mold apparatus (10, 200, 300, 400, 500, or 600) may comprise a two mold plate design as opposed to the three mold plate design disclosed therein. Moreover, the mold apparatus (10, 200, 300, 400, 500, or 600) may include different gate arrangements for delivering the moldable material to the mold cavity or mold cavities. It is also understood that the specific devices and methods illustrated in the attached drawings, and described in the following specification, are simply exemplary embodiments of the inventive concepts defined in the appended claims. Hence, specific dimensions and other physical characteristics relating to the embodiments disclosed herein are not to be considered limiting unless the claims expressly state otherwise.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

We claim:

1. A mold assembly for molding at least one attachment member on a sheet of material on an area of the sheet remote from the peripheral portion of the sheet, said mold assembly comprising:

first and second mold sections having first and second facing surfaces respectively, said facing surface of said first mold section including a first sheet holding surface;

a movable, primary pressure pad being resiliently supported by said second mold section and including a second sheet holding surface thereon;

a first mold cavity defined by at least one of said first mold section, said second mold section, and said primary pressure pad;

at least one resilient member urging said primary pressure pad toward said first mold section for holding the sheet therebetween;

a secondary pressure pad extending within at least a portion of said movable, primary pressure pad, said secondary pressure pad being supported by one of said primary pressure pad and said second mold section, said secondary pressure pad defining a second mold cavity and being adapted to hold the attachment member remote from the peripheral portion of the sheet, said secondary pressure pad including a third facing surface, and at least a portion of said third facing surface being spaced from the sheet to define said second mold cavity therebetween when a sheet is supported in said mold assembly; and at least one of said first and second mold sections including a moldable material delivery system for directing moldable material to said first and second mold cavities.

2. A mold assembly according to claim 1, said secondary pressure pad being supported by one of said movable, primary pressure pad and said second mold section on at least one guide.

3. A mold assembly according to claim 2, said secondary pressure pad further being positioned in said one of said movable, primary pressure pad and said second mold section by a pin.

4. A mold assembly according to claim 1, wherein said secondary pressure pad comprises a movable, secondary pressure pad, said movable, secondary pressure pad being movably supported by one of said movable, primary pressure pad and said second mold section.

5. A mold assembly according to claim 4, said movable, secondary pressure pad being urged toward said first mold section by a resilient member, said resilient member being interposed between said movable, secondary pressure pad and said one of said primary pressure pad and said second mold section.

6. A mold assembly according to claim 1, wherein said secondary pressure pad is supported by said movable, primary pressure pad.

7. A mold assembly according to claim 1, wherein said secondary pressure pad is supported by said movable, primary pressure pad on at least one shoulder bolt.

8. A mold assembly according to claim 7, said secondary pressure pad further being positioned in said primary pressure pad by a pin.

9. A mold assembly according to claim 7, said secondary pressure pad comprising a movable, secondary pressure pad, said movable, secondary pressure pad being urged toward said first mold section by a resilient member, said resilient member being interposed between said movable, primary pressure pad and said movable, secondary pressure pad.

10. A mold assembly according to claim 6, said primary pressure pad including a recess, said secondary pressure pad being supported in said recess.

11. A mold assembly according to claim 10, wherein said secondary pressure pad is supported in said recess of said movable, primary pressure pad by a shoulder bolt.

12. A mold assembly according to claim 10, further comprising a resilient member interposed between said primary pressure pad and said secondary pressure pad, said resilient member urging said secondary pressure pad toward said first mold section.

13. A mold assembly according to claim 12, wherein said resilient member comprises one of an elastomeric resilient spring and a helical spring.

14. A mold assembly according to claim 13, wherein said secondary pressure pad includes a spring recess, said resilient member being positioned between said movable, primary pressure pad and said secondary pressure pad and extending into said spring recess.

15. A mold assembly according to claim 12, further comprising at least one resilient member urging said secondary pressure pad toward said first mold section, said resilient member urging said movable, primary pressure pad having a first stiffness, said resilient member urging said secondary pressure pad having a second stiffness, and said first stiffness being less than said second stiffness.

16. A mold assembly according to claim 1, wherein said secondary pressure pad includes an attachment member recess in communication with said second cavity adapted for holding the attachment member therein.

17. A mold assembly according to claim 16, wherein said attachment member recess is adapted to frictionally hold the attachment member therein.

18. A mold assembly according to claim 16, wherein said attachment member recess is adapted to compress the attachment member to thereby frictionally hold the attachment member therein.

19. A mold assembly according to claim 16, wherein said attachment member recess includes an alignment surface for guiding and aligning the attachment member therein.

20. A mold assembly according to claim 19, wherein said alignment surface comprises an annular shoulder for guiding and aligning the attachment member therein.

21. A mold assembly according to claim 16, wherein said third facing surface includes a third sheet holding surface adjacent said second mold cavity.

22. A mold assembly according to claim 1, wherein said secondary pressure pad is supported by said second mold section.

23. A mold assembly according to claim 22, wherein said secondary pressure pad is supported in said second mold section by a shoulder bolt.

24. A mold assembly according to claim 22, said secondary pressure pad being urged toward said first mold section by a resilient member, said resilient member being interposed between said secondary pressure pad and said second mold section.

25. A mold assembly according to claim 24, wherein said secondary pressure pad includes a spring recess, said resilient member being positioned between said movable, primary pressure pad and said secondary pressure pad and extending into said spring recess.

26. A mold assembly according to claim 22, said movable, primary pressure pad including a transverse passage, said secondary pressure pad extending through said transverse passage and including a third pressure pad, said third pressure pad adapted for limited movement in said transverse passage.

27. A mold assembly according to claim 26, further comprising a resilient member urging said third pressure pad toward said first mold section.

28. A mold assembly according to claim 23, said secondary pressure pad including a shoulder, said resilient member being interposed between said shoulder and said third pressure pad.

29. A mold assembly according to claim 28, wherein said resilient member comprises one of an elastomeric resilient spring and a helical spring.

30. A mold assembly according to claim 28, wherein said resilient member comprises a urethane ring.

31. A mold assembly according to claim 1, further comprising a second secondary pressure pad adapted for holding a second attachment member remote from the peripheral portion of the sheet during molding, said second secondary pressure pad extending through at least a portion of said movable, primary pressure pad, and said second secondary pressure pad including a third mold cavity for forming a molded member around the second attachment member.

32. A mold assembly according to claim 1, wherein said secondary pressure pad comprises one of polyethylene terephthalate and steel.

33. A mold assembly for molding a moldable material on a peripheral portion of a sheet and around an attachment member remotely located from the peripheral portion of the sheet, said molding assembly comprising:

first and second mold sections having facing surfaces and defining a first mold cavity therebetween, said first mold section including a first sheet holding surface, and said second mold section having a movable, primary pressure pad, said movable, primary pressure pad having a second sheet holding surface extending along and adjacent said first mold cavity;

at least one resilient member urging said movable, primary pressure pad toward said first mold section for holding the sheet between said first and second sheet holding surfaces;

a secondary pressure pad being supported by one of said movable, primary pressure pad and said second mold section, said secondary pressure pad extending within at least a portion of said movable, primary pressure pad and including a second mold cavity for forming a molded member around the attachment member on the sheet when supported in said mold assembly, said secondary pressure pad being adapted to hold the attachment member at a location remote from said first mold cavity during molding and having a third sheet holding surface at a position spaced from at least a portion of said second sheet holding surface for holding the sheet during molding; and at least one of said first and second mold sections including a moldable material delivery system for delivering moldable material to said first and second mold cavities.

34. A mold assembly according to claim 33, wherein said first mold cavity is positioned for forming a molded member on the periphery of the sheet.

35. A mold assembly according to claim 34, wherein said first mold cavity is adapted to form a molded gasket on the peripheral portion of the sheet.

36. A mold assembly according to claim 33, wherein said first mold cavity and said second mold cavity are in fluid communication.

37. A mold assembly according to claim 33, further comprising at least one resilient member urging said secondary pressure pad toward said first mold section.

38. A mold assembly according to claim 37, said resilient member for urging said movable, primary pad having a first stiffness, said resilient member for urging said secondary pad having a second stiffness, and said first stiffness being greater than said second stiffness whereby said secondary pressure pad can accommodate a wider range of dimensional variation in the sheet.

39. A mold assembly according to claim 33, said secondary pressure pad including an attachment recess in said second mold cavity, said attachment recess of said secondary pressure pad being adapted to hold the attachment member during molding.

40. A mold assembly according to claim 39, said attachment recess being adapted to compress the attachment member to frictionally hold the attachment member therein.

41. A mold assembly according to claim 33, wherein said secondary pressure pad comprises a movable, secondary pressure pad, said movable, secondary pressure pad being movably supported by one of said movable, primary pressure pad and said second mold section.

42. A mold assembly according to claim 33, said secondary pressure pad being urged toward said first mold section by a resilient member, said resilient member being interposed between said secondary pressure pad and said one of said movable, primary pressure pad and said second mold section.

43. A mold assembly according to claim 33, wherein said secondary pressure pad is supported in said mold assembly independent of said movable, primary pressure pad.

44. A mold assembly according to claim 43, wherein said secondary pressure pad includes a third pressure pad, said third pressure pad being movably supported by said secondary pressure pad and including a third sheet holding surface.

45. A mold assembly according to claim 44, wherein said third pressure pad is urged toward said first mold section by a resilient member.

46. A mold assembly according to claim 33, wherein said secondary pressure pad is supported by said movable, primary pressure pad.

47. A mold assembly according to claim 33, wherein said secondary pressure comprises one of polyethylene terephthalate and steel.

* * * * *